3,426,074
MESOMERIC TRIPHOSPHONIUM
DICATION SALTS
Clifford N. Matthews, St. Louis, and Gail H. Birum, Kirkwood, Mo., assignors to Monsanto Company, St. Louis, Mo., a corporation of Delaware
No Drawing. Filed Mar. 31, 1966, Ser. No. 545,785
U.S. Cl. 260—606.5     19 Claims
Int. Cl. C07f 9/50; A61k 13/00

This invention relates to mesomeric triphosphonium dication salts and to processes for making them.

The novel mesomeric triphosphonium dication salts of this invention can be represented by the following formula

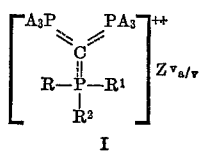

wherein each A is aryl, $R^1$ and $R^2$, which can be the same or different, are organic radicals containing from 1 to 20 carbon atoms in which any unsaturation is aromatic selected from the group consisting of hydrocarbyl, haloaryl and haloaralkyl, R is selected from the group consisting of hydrogen, alkyl having from 1 to 12 carbon atoms, alkenyl having from 2 to 12 carbon atoms, aralkyl having 7 to 12 carbon atoms, —N=N—$C_6H_5$ and halogen (Cl, Br, I, F); Z represents an anion, $v$ is the actual valence of the anion Z and is an integer from 1 to 2, and $a$ is an integer of 2.

The term hydrocarbyl as used herein and in the appended claims means those radicals which result from the removal of hydrogen from hydrocarbon compounds.

The novel triphosphonium salts of Formula I, being mesomeric, can be represented by the formulae:

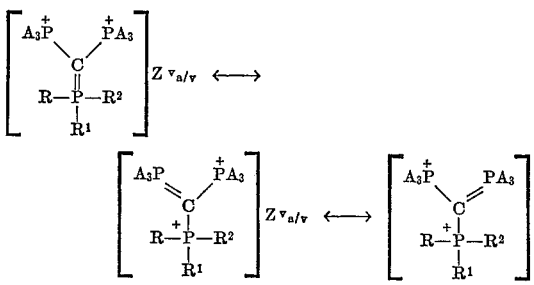

or they can be written to show the equivalence or near-equivalence of the three phosphorus atoms as in Formula I above.

For the sake of brevity and simplicity the mesomeric triphosphonium dication salts of this invention will sometimes be represented hereinafter by the following structure:

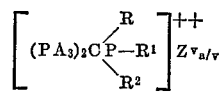

wherein A, R, $R^1$, $R^2$, Z, and $a$ and $v$ are as disclosed above.

The mesomeric triphosphonium dication salts of Formula I vary from solids to viscous liquids depending upon the nature of the R, $R^1$ and $R^2$ substituents and also on the specific anion. They are essentially insoluble in ethers such as diethyl ether and diglyme and in alkyl and aryl hydrocarbons such as benzene, chlorobenzene, toluene, xylene, hexane, cyclohexane and the like, and are generally soluble in lower aliphatic alcohols such as methyl alcohol, ethyl alcohol, propyl alcohol, isopropyl alcohol, and in methylene chloride, chloroform and acetonitrile.

A subclass of mesomeric triphosphonium dication salts of this invention, preferred because they are prepared in one step and hereinafter referred to therefore as primary products, are compounds represented by the following formulae

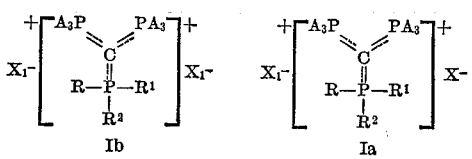

in which A, R, $R_1$ and $R_2$ are as defined above, X is a monovalent anion and $X_1$ is selected from the group consisting of Cl, Br, I and F.

The reactions of the primary process of this invention can be summarized according to the following general equations.

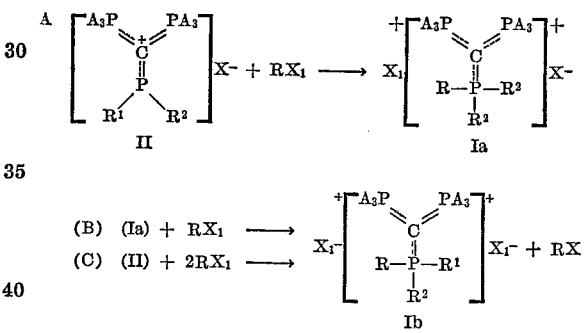

wherein A, R, $R^1$, $R^2$, X and $X_1$ are as defined above.

The mesomeric diphosphonium monocation salts of Formula II above which are used in the prepartion of the mesomeric triphosphonium dication salts of this invention and processes for making them are disclosed and claimed in copending application Ser. No. 538,593, filed Mar. 30, 1966.

The primary reactions of this invention are carried out in the presence of an inert organic medium which can be solvent or suspending agent for either or both of the reactants. In carrying out the primary reactions of this invention, the reactants represented by the formulae $[(A_3P)_2CPR^1R^2]^+X^-$ and $RX_1$ can be added separately or concomitantly to the reaction vessel in equimolar amounts or an excess of either reactant can be used. If excess reactant is employed it is generally preferred that it be the $RX_1$ reactant since it will sometimes serve as reaction medium and can easily be separated from the product. Temperature of reaction for process steps (A), (B) and (C) is not critical and good results can generally be obtained from about 0° C. to 150° C. Temperatures from 25° C. to 100° C. are preferred.

The reaction media employed in process steps (A), (B) and (C) can be any of the well-known solvents and diluents which are inert to the reactants, e.g. alkyl alcohols such as methyl alcohol and ethyl alcohol, and acetonitrile, dimethylacetamide, methylene chloride, chloroform and the like.

The separation of the desired mesomeric triphosphonium compound from the reaction mixture is readily accomplished by conventional means well known in the art, e.g. filtration, fractional distillation under reduced pressure, selective extraction, fractional distillation using a carrier gas, film distillation, elution or any suitable combination of these methods.

Representative R groups for the above formula include by way of example alkyl such as methyl, ethyl, propyl, butyl, isopropyl, isobutyl, amyl, heptyl, hexyl, octyl, nonyl, decyl and dodecyl, alkenyl such as allyl, 2-methyl-2-propenyl, 2-butenyl, 3-butenyl, 2-pentenyl, 3-pentenyl, 4-hexenyl, 2-heptenyl, and aralkyl groups such as benzyl, phenylethyl and phenylpropyl. R can also be hydrogen, a halogen (F, Cl, Br and I) and an aryldiazo group.

As mentioned hereinbefore generically, $R^1$ and $R^2$ can be alkyl, cycloalkyl, aryl, haloaryl, aralkyl, haloaralkyl and alkaryl containing up to 20 carbon atoms. Representative $R^1$ and $R^2$ radicals for the compounds of the above formulae prepared by the process of this invention include by way of example alkyl (1 to 18 carbon atoms) such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl and the various homologues and isomers of alkyl having from 1 to 20 carbon atoms, cycloalkyl and alkyl substituted cycloalkyl such as cyclopentyl, cyclohexyl, mono- and polymethylcyclohexyl, mono- and polyethylcyclohexyl, cycloheptyl and the like, aryl such as phenyl, biphenyl, naphthyl and the like, aralkyl (7 to 18 carbon atoms) such as benzyl, phenylethyl, diphenylmethyl and the like; alkaryl (7 to 18 carbon atoms) such as tolyl, ethylphenyl, xylyl, butylphenyl, tert-butylphenyl, trimethylphenyl, diethylphenyl, methylpropylethylphenyl and the like; haloaryl such as chlorophenyl, bromophenyl, fluorophenyl, 2,4-diiodophenyl, 2,4,5-trichlorophenyl, 2,4,6-trichlorophenyl, 2,3,4,5,6-pentachlorophenyl and the like, and haloaralkyl such as chlorobenzyl, bromobenzyl, chlorophenylethyl, 2,4-dibromophenylethyl, di(2,4-dichlorophenyl)methyl and the like. Within this class $R^1$ and $R^2$ radicals of not more than 12 carbon atoms containing from 0 to 5 halogen atoms are preferred. Representative A aryl radicals include by way of example those listed under R and $R^1$ above.

The mesomeric triphosphonium salts of this invention other than the chloride and bromide salts can be prepared from the primary products by metathesis, halogen addition, and addition of metal halides in which the bond character is more covalent than ionic. Thus Z can be any anion, organic or inorganic. Representative Z inorganic anions include by way of example halides ($Cl^-$, $Br^-$, $F^-$ and $I^-$); inorganic oxyanions such as sulfate, bisulfate, nitrate, phosphate, cyanate, thiocyanate, chlorate, perchlorate, sulfide, bromate, permanganate, phosphonate and the like; perhalide anions such as $I_3^-$, $Br_3^-$, $Cl_3^-$ and interhalogens such as $BrCl_2^-$, $IBr_2^-$, $ICl_2^-$, $ClBr_2^-$ and the like; complex haloanions of phosphorus, silicon and boron such as $PCl_6^-$, $PF_6^-$, $PCl_3F_3^-$, $PBr_6^-$ and the like, $SiF_5^-$, $BCl_4^-$, $BF_4^-$, $BCl_2F_2^-$, $BBr_2I_2^-$, $BI_4^-$ and the like; complex hydride anions including a Group III element such as $BH_4^-$, $AlH_4^-$, $GaH_4^-$ and the like; complex metallic halide anions of metals wherein the original metal to halide bond is more covalent than ionic such as Al, Sb, As, Be, Bi, Cd, Ce, Co, Cu, Ga, Au, In, Fe, La, Pb, Mn, Hg, Nb, Ni, Os, Re, Se, Ag, Ta, Tl, Sn, Zn and so forth.

The metal halides used in the present invention in the preparation of mesomeric phosphonium salts wherein the anion is a complex metallic halide anion are those wherein the character of the bond calculated using the electronegativity scale given at p. 93 and discussed at pp. 97–102 of Linus Pauling's "Nature of the Chemical Bond," 3d ed. (Cornell Univ. Press, 1960) is less than ½ ionic. Representative metal halides which add to the primary products of this invention to form complex metallic halide anions are the following:

| | | |
|---|---|---|
| $AlBr_3$ | $CdCl_2$ | $InI_3$ |
| $AlCl_3$ | $CdF_2$ | $FeBr_2$ |
| $AlF_3$ | $CdI_2$ | $FeBr_3$ |
| $SbBr_3$ | $CeCl_3$ | $FeCl_2$ |
| $SbCl_3$ | $CoBr_2$ | $FeCl_3$ |
| $SbI_3$ | $CoCl_2$ | $FeBr_3$ |
| $SbCl_5$ | $CoI_2$ | $FeI_2$ |
| $SbI_3$ | $CuBr$ | $LaBr_3$ |
| $SbI_5$ | $CuBr_2$ | $LaCl_3$ |
| $AsBr_3$ | $CuCl$ | $LaI_3$ |
| $AsCl_3$ | $CuCl_2$ | $PbBr_2$ |
| $NbCl_5$ | $TaBr_3$ | $KBr$ |
| $NiBr_2$ | $TiCl_3$ | $SnCl_4$ |
| $NiCl_2$ | $SnBr_2$ | $TiCl_4$ |
| $NiI_2$ | $SnCl_2$ | $TiBr_4$ |
| $OsF_6$ | $ZnBr_2$ | $TiI_4$ |
| $ReCl_3$ | $ZnCl_2$ | $BaCl_2$ |
| $AsF_3$ | $CuI$ | $PbCl_2$ |
| $AsI_3$ | $GaBr_3$ | $PbI_2$ |
| $BeBr_2$ | $GaCl_3$ | $MnBr_3$ |
| $BeCl_2$ | $GaI_3$ | $MnCl_2$ |
| $BeF_2$ | $AuBr$ | $MnI_2$ |
| $BeI_2$ | $AuBr_3$ | $HgBr_2$ |
| $BiBr_3$ | $AuCl$ | $HgBrI$ |
| $BiCl_3$ | $AuCl_3$ | $HgCl_2$ |
| $BiBr_3$ | $AuI_3$ | $HgF_2$ |
| $BiI_3$ | $InBr_3$ | $HgI_2$ |
| $CdBr_2$ | $InCl_3$ | $NbBr_5$ |
| $ReCl_6$ | $ZnI_2$ | $ReCl_3$ |
| $SeF_4$ | $NaCl$ | $TaCl_5$ |
| $AgBr$ | $NaI$ | $ZnCl_2$ |
| $AgF$ | $NaBr$ | $KI$ |
| $AgI$ | $KCl$ | $BaCl_2$ |
| $TaCl_5$ | $AsF_6$ | $SbCl_6$ |

Representative Z organic anions include by way of example and not limitation organic oxyanions such as carboxylates comprising aliphatic and aromatic, mono- and polybasic, wherein the organic radical is hydrocarbon or hydrocarbon substituted by various radicals, such as acetates, benzoates, glutarates, laurates, oleates and the like; anions of organic acids and hydroxyl compounds such as toluenesulfonic acid, phenylphosphinic acid, benzeneboronic acid, phenol, 2,4,6-triphenylphenol and the like; non-oxy organic anions of organic substituted metals and boron such as tetraphenylboronate, $[Cr(SCN)_4 (NH_3)_2]^-$ and the like.

The preferred X and Z anions of the novel mesomeric triphosphonium salt-forming dications of this invention are the acid anions, inorganic and organic, the perhalogens and the complex metallic halide anions.

The acid anions are usually reacted with the primary products of Formula Ia and Ib as the free acids, or the alkali metal or ammonium salts in order to form additional mesomeric triphosphonium dication salts by metathesis. In order to form the perhalogen salts and the complex metallic halide salts of the present invention the halogens and metallic halides are simply mixed with the primary products of Formula Ia and Ib in a suitable organic medium.

Specific examples of metathesis reaction applicable to this invention are given by the following equations.

(C)

$$+ \begin{bmatrix} A_3P & PA_3 \\ & \diagdown\diagup \\ & C \\ & \| \\ R-\underset{\underset{R^2}{|}}{P}-R^1 \end{bmatrix} + \quad I^- \quad I^- + 2NaBF_4 \longrightarrow$$

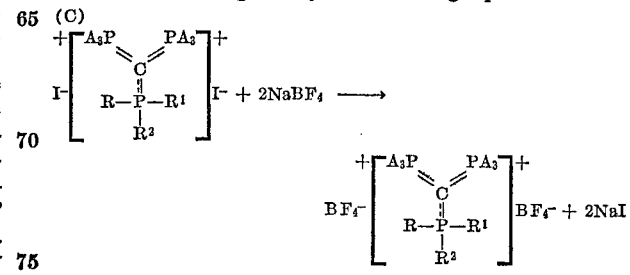

(D)

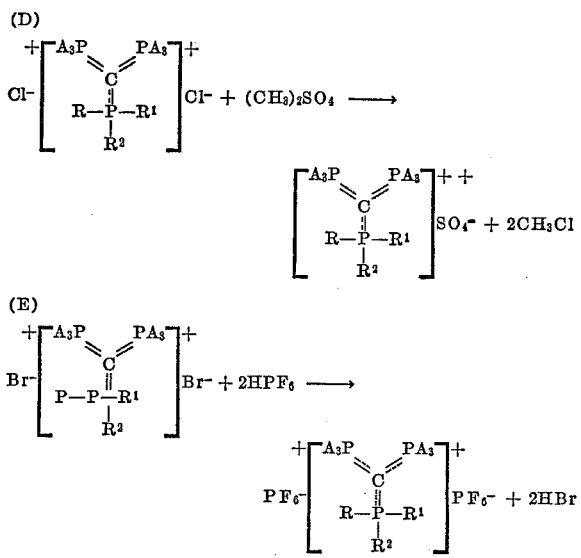

A specific example of a metallic halide addition reaction is given by the following equation.

(F)

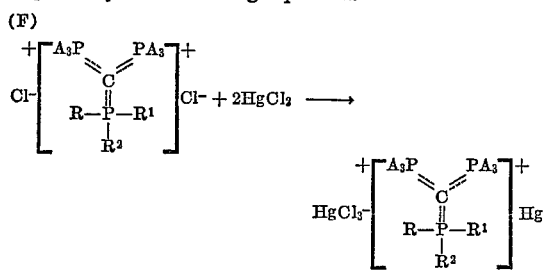

Perhalogen salts can be prepared in accordance with the following equation:

(G)

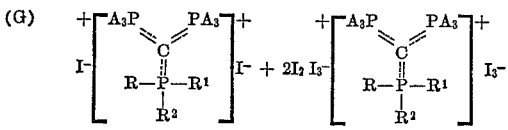

Metathesis, halogen addition and addition of metallic halides can be carried out in the presence of an inert organic medium at widely varying temperatures depending on the specific reactants with temperatures from 20° C. to 100° C. being preferred. The inert organic medium is generally selected so that the desired mesomeric triphosphonium salt precipitates. Alternatively the inert organic medium can be selected so that the alkali metal or ammonium salt by-product precipitates, leaving the desired phosphonium salt in solution. Well-known methods of separation and purification such as filtration, decantation, fractional crystallization, extraction, chromatography and selective precipitation by addition of another diluent can be used.

The mesomeric dication salts of this invention can be used as pest controlling agents, textile auxiliaries, means for soil amelioration, disinfectants (bactericides and fungicides), detergents, additives for petroleum products and means for flameproofing polymers, ion exchangers and the like.

The following examples further illustrate the invention. Parts and percent are by weight unless otherwise indicated.

Example 1

This example describes the preparation of

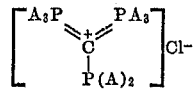

wherein each A represents phenyl.

A reaction vessel is charged with 42.8 parts of hexaphenylcarbodiphosphorane and 400 parts of diglyme and then 19 parts of chlorodiphenylphosphine is added dropwise at a temperature of about 75° C. over a period of about 12 minutes. The reaction mixture is stirred for an additional 15 min. at a temperature of about 75° C. and filtered. The product solid is washed with diethyl ether and dried at 60° C./0.1 mm. for sixteen hours to give 57.8 parts (96% yield) of a light tan solid, M.P. 251–254° (with decomposition); $P^{31}$ NMR spectrum (doublet at $-27.5$ and $-24.4$ p.p.m. and triplet at $-0.6$, $+2.5$ and $+5.6$ p.p.m. in a 2:1 area ratio).

*Analysis.*—Calcd. for $C_{49}H_{40}ClP_3$: C, 77.72; H, 5.32; Cl$^-$, 4.68; P, 12.27. Found: C, 77.12; H, 5.37; Cl$^-$, 4.54; P, 12.34.

A portion of the product of Example 1 above is warmed to 80° in diglyme and sufficient acetonitrile is added to give a clear solution which is then allowed to stand at room temperature for three days. The product is filtered, washed with diglyme and diethyl ether and dried at 100°/0.1 mm. for sixteen hours to give colorless crystals, M.P. 254–257° (dec.); the $P^{31}$ NMR spectrum has a doublet centered at about $-26$ p.p.m. and a 1–2–1 triplet at $+1.5$ p.p.m. ( relative to $H_3PO_4$) in the theoretical 2:1 area ratio, Jpp 75 c.p.s. at both 24.3 and 40.5 mc.; $H^1$ NMR, aryl hydrogen centered at about $-7.5$ and $-7.2$ p.p.m. in the theoretical 3:1 area ratio; the infrared spectrum has three strong characteristic absorption bands of about equal intensity at about 9.1, 10.1 and 11.4 microns.

*Analysis.*—Found: C, 77.62; H, 5.31; Cl$^-$, 4.57; P, 12.22.

Example 2

This example describes the preparation of

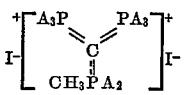

wherein each A represents phenyl.

A solution of 15.1 parts of the product of Example 1 in 65 parts of ethyl alcohol is stirred as 17 parts (200% excess) of methyl iodide is added. The reaction mixture is stirred at room temperature for about 15 hours. About 40% of the ethyl alcohol is then removed by distillation and the remaining reaction mixture is allowed to cool to room temperature. The precipitate is separated by filtration, washed with ethyl alcohol and with diethyl ether and dried for 8 hours at 100°/0.1 mm. to give 18.5 parts (93.5% yield) of white solid, M.P. 293–294.5° (dec.).

*Analysis.*—Calcd. for $C_{50}H_{43}I_2P_3$: C, 60.62; H, 4.37; I$^-$, 25.62; P, 9.38. Found: C, 60.27; H, 4.39; I$^-$, 25.43; P, 9.33.

The $P^{31}$ NMR spectrum at 24.3 mc. in methanol had signals at $-25.6$ and $-22.6$ p.p.m. in a 2:1 area ratio; in pyridine at 40.5 mc. the signals were at $-25.1$ and $-22.0$ p.p.m. in a 2:1 ratio. Proton NMR measurements in methyl alcohol at 60 mc. showed aryl hydrogen at $-7.82$ (70%) and at $-7.57$ p.p.m. (22%) and a doublet at $-2.76$ (7%, $J_{HP}12$ c.p.s.); in dichloromethane at 60 mc. the aryl hydrogen were at $-7.86$ (76%) and at $-7.51$ p.p.m. (17%) and the doublet at $-2.88$ (7% $J_{HP}10$ c.p.s.); in pyridine at 60 mc. the doublet was at $-3.13$ ($J_{HP}12$ c.p.s.); in pyridine at 100 mc. the doublet became a singlet when the phosphorus was decoupled.

EXAMPLE 3

This example describes the preparation of

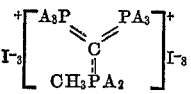

wherein A represents phenyl. A solution of 1.0 part of the product of Example 2 in methyl alcohol is slowly added to a solution of 0.6 parts of iodine in methyl alcohol at room temperature. The reaction mixture is heated at reflux for 15 min., cooled, filtered and the solid washed with methyl alcohol. The solid is then dissolved in acetone with 0.3 parts of additional iodine. Ethyl ether is added and a solid separates. The solid is washed with methyl alcohol, redissolved in acetone, precipitated with methyl alcohol and dried for 16 hours at 60°/0.05 mm. to give 1.2 parts (80%) of dark red to black crystals, M.P. 127–129°.

*Analysis.*—Calcd. for $C_{50}H_{43}I_6P_3$: C, 40.15; H, 2.89; I, 50.77; P, 6.21. Found: C, 40.12; H, 3.02; I, 50.48; P, 6.07.

EXAMPLE 4

This example describes the preparation of

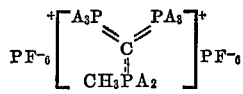

wherein each A represents phenyl. A mixture of 2.0 parts of the product of Example 2 and 1.5 parts of $KPF_6$ in 30 ml. of methyl alcohol is warmed at reflux for 30 min. The reaction mixture is filtered hot and the solid washed with methyl alcohol and with ethyl ether to give 1.7 parts of white solid, M.P. 300–304° (dec.). This white solid material and 0.5 parts $KPF_6$ are dissolved in 6 parts of dimethylformamide and stirred as 30 parts of methyl alcohol is added. This mixture is warmed to reflux, cooled, filtered and the solid washed with methyl alcohol and with ethyl ether and dried for 10 hours at 120°/0.1 mm. to give 0.8 parts of white crystals, M.P. 310–313°.

*Analysis.*—Calcd. for $C_{50}H_{43}F_{12}P_5$: C, 58.48; H, 4.22; F, 22.20, P, 15.09. Found: C, 58.53; H, 4.41; F, 22.45; P, 15.19.

EXAMPLE 5

This example describes the preparation of

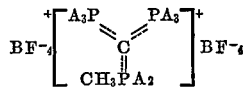

wherein each A represents phenyl. A solution of 2.6 parts of the product of Example 2 in methyl alcohol is stirred as a solution of 1.0 part of $AgBF_4$ in methyl alcohol is added dropwise. A yellow precipitate forms immediately. The precipitate is separated by filtration, extracted with hot methyl alcohol and dried to give 1.2 parts (100%) of AgI. The filtrate is diluted with ethyl ether to precipitate a light-colored solid which is dissolved in methylene chloride. The solution is filtered, diluted with ethyl ether and the resulting solid again precipitated from an ethyl alcohol solution by addition of ethyl ether. The product is dried for 4 hours at 70°/0.1 mm. to give off-white crystals, M.P. 306–309°.

*Analysis.*—Calcd. for $C_{50}H_{43}B_2F_8P_3$: C, 65.96; H, 4.76; B, 2.37; F, 16.69; P, 10.20. Found: C, 65.73; H, 4.90; B, 2.35; F, 16.67; H, 9.98.

EXAMPLE 6

This example describes the preparation of

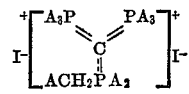

wherein each A represents phenyl.

A mixture of 8.0 parts of the product of Example 1 and 30 parts of benzyl bromide is stirred and warmed to about 145°, giving a clear solution from which a solid begins separating after a few minutes. About 30 parts of dry diglyme is added to facilitate stirring, and warming is contained at about 145° C. for an additional 15 min. The reaction mixture is filtered hot, and the solid washed with diglyme and ether to give a cream-color powder. This powder is dissolved in 15 parts of ethyl alcohol and then 15 parts of methyl iodide is added (this treatment is used to replace bromide ions with iodide ions). The solution is heated to about 70° and a white solid separates. Another 10 parts of $CH_3I$ is added at room temperature and the reaction vessel is allowed to stand for 16 hours at about 25° C. The excess methyl iodide and about one-third of the ethyl alcohol are then removed by distillation of atmospheric pressure. The remaining reaction mixture is filtered hot, and the solid washed with ethyl alcohol and then recrystallized from methyl alcohol and dried for 16 hours at 120°/0.1 mm. to give 2.7 parts of light colored solid, M.P. 230–232° (5.6 g. of additional product, M.P. 229–232°, was isolated in three crops from the filtrate).

*Analysis.*—Calcd. for $C_{56}H_{47}I_2P_3$: C, 63.05; H, 4.44; I⁻, 23.80; P, 8.71; Br, 0.00. Found: C, 62.67; H, 4.53; I⁻, 23.81; P, 8.57; Br, 0.05.

Example 7

This example describes the preparation of

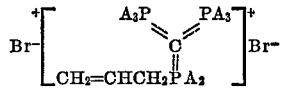

wherein each A represents phenyl. A solution of 5.3 parts of the product of Example 1 and 5.1 parts of allyl bromide in 20 parts of ethyl alcohol is stirred at room temperature for 10 hours and then at about 70° C. for one hour. Ethyl ether is added at room temperature, and after stirring for 2 hours, the mixture is filtered and the product washed with ethyl ether to give 5.2 parts of white powder (another 1.1 part separated from the filtrate). The first portion is dissolved in hot ethyl alcohol, cooled and a small amount of ether is added to initiate precipitation. Filtration, followed by washing of the solid with ethyl alcohol and then another recrystallization from ethyl alcohol and drying for 20 hours at 100°/0.1 mm. gives 2.2 parts (34%) of white powder, M.P. 268–271° (dec.).

*Analysis.*—Calcd for $C_{52}H_{45}Br_2P_3$: C, 67.69; H, 4.92; Br⁻, 17.32; P, 10.07; Cl⁻, 0.00. Found: C, 68.07; H, 5.12; Br⁻, 16.84; P, 9.90; Cl⁻, trace.

Example 8

This example describes the preparation of

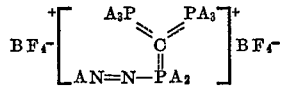

wherein each A represents phenyl. A solution of 7.6 parts of the product of Example 1 in 30 parts of methyl alcohol is stirred as 4.2 parts of benzenediazonium fluoborate is added in small portions at room temperature (25° C.). The color changes rapidly to red, and a solid separates. The reaction mixture is warmed at about 50° C. for about 1.5 hours, filtered and the solid washed with methyl alcohol and extracted with 30 parts of warm methanol and dried to give 8.6 parts (86%) of red powder. The color changes from red to off-white with some melting at 215–217° C. and the remaining solid melts at 255–263° C. A portion of the solid is recrystallized from ethyl alcohol-acetonitrile to give red crystals, which change from red to white with some melting at 219–220° and the remaining solid melts at 255–258°; $P^{31}$ NMR spectrum (signals at −38.9 and −24.1 p.p.m. in about a 1:2 ratio).

*Analysis.*—Calcd for $C_{55}H_{45}F_8N_2P_3$: B, 2.16; Cl, 0.00; F, 15.20; N, 2.80; P, 9.29. Found: B, 2.32; Cl, 0.12; F, 15.01; N, 2.88; P, 9.35.

Examples 9 to 26 (Table 1)

Examples 9 to 26 describe the preparation of compounds of the formula

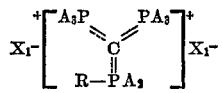

wherein each A represents phenyl and $X_1$ and R are as given in Table 1 by reaction of $[(A_3P)_2CPA_2]^+Cl^-$ with compounds of the formula $RX_1$. Reaction conditions and purification procedures similar to those employed in Example 2 are used in Examples 9 to 26. Results and further details are given below.

TABLE I

| Example: | Reactant, RX₁ | Product R | X₁ |
|---|---|---|---|
| 9 | Cl₂ | Cl | Cl |
| 10 | Ethyl bromide | Ethyl | Br |
| 11 | 2-chlorobutane | Butyl | Cl |
| 12 | 4-bromodecane | Decyl | Br |
| 13 | Br₂ | Br | Br |
| 14 | I₂ | I | I |
| 15 | 1-bromo-2-butylene | 2-butenyl | Br |
| 16 | 1-iodo-3-butylene | 3-butenyl | I |
| 17 | 1-chloro-2-pentylene | 2-pentenyl | Cl |
| 18 | 1-bromo-5-hexylene | 5-hexenyl | Br |
| 19 | 1-chloro-2-heptylene | 2-heptenyl | Cl |
| 20 | 1-iodo-3-octylene | 3-octenyl | I |
| 21 | α-iodoethylbenzene | Phenylethyl | I |
| 22 | α-chloropropylbenzene | Phenylpropyl | Cl |
| 23 | HBr | H | Br |
| 24 | HI | H | I |
| 25 | HF | H | F |
| 26 | HCl | H | Cl |

Examples 27 to 41 (Table 2)

Examples 27 to 41 describe the preparation of compounds of the formula

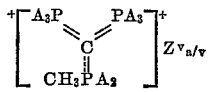

wherein each A represents phenyl, Z is an anion, $v$ is the actual valence of the anion Z and is an integer from 1 to 2 and $a$ is an integer of 2 by metathesis and addition reactions with salts of the formula

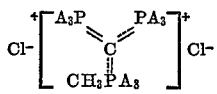

Reaction conditions and purification techniques similar to those employed in Examples 4 and 5 are ued in Examples 27 to 41. Results and further details are given below.

TABLE 2

| Example | Metathesis | Addition | Product a᷎ᵥ | Z |
|---|---|---|---|---|
| 27 | Na₂SO₄ | | 1 | SO₄ |
| 28 | KCN | | 2 | CN |
| 29 | NaNO₃ | | 2 | NO₃ |
| 30 | K₂SO₄ | | 1 | SO₄ |
| 31 | KPCl₆ | | 2 | PCl₆ |
| 32 | KBH₄ | | 2 | BH₄ |
| 33 | CH₃CH₂COONa | | 2 | C₂H₅OO |
| 34 | CF₃COONa | | 2 | CF₃COO |
| 35 | C₆H₅COONa | | 2 | C₆H₅COO |
| 36 | K[Cr(SCN)₄(NH₃)₂] | | 2 | [Cr(SCN)₄(NH₃)₂] |
| 37 | | FeCl₃ | 2 | FeCl₄ |
| 38 | | AlCl₃ | 2 | AlCl₄ |
| 39 | | HgCl₂ | 2 | HgCl₃ |
| 40 | | Cl₂ | 2 | Cl₃ |
| 41 | | Br₂ | 2 | Br₂Cl |

Having thus described our invention, what we desire to claim and secure by Letters Patent is:

1. Compounds as represented by the formula:

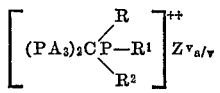

wherein each A is aryl, R¹ and R² are organic radicals having from 1 to 20 carbon atoms in which any unsaturation is aromatic selected from the group consisting of hydrocarbyl, haloaryl and haloaralkyl, R is selected from the group consisting of hydrogen, alkyl of 1 to 12 carbon atoms, alkenyl of 2 to 12 carbon atoms, aralkyl of 7 to 12 carbon atoms, —N=NC₆H₅ and halogen, Z represents an anion, V is the actual valence of the anion Z and is an integer from 1 to 2 and $a$ is an integer of 2.

2. Compounds of claim 1 wherein Z is selected from the group consisting of acid anions, perhalogen anions and complex metallic halide anions.

3. Compounds of claim 1 wherein R¹ and R² are alkyl.

4. Compounds of claim 1 wherein R¹ and R² are methyl.

5. Compounds of claim 1 wherein R¹ and R² are phenyl.

6. Compounds of claim 1 wherein R is hydrogen and R¹ and R² are phenyl.

7. Compounds of claim 1 wherein R is alkyl and R¹ and R² are phenyl.

8. Compounds of claim 1 wherein R is methyl and R¹ and R² are phenyl.

9. Compounds of claim 1 wherein R is phenylmethyl and R¹ and R² are phenyl.

10. Compounds of claim 1 wherein R is propenyl and R¹ and R² are phenyl.

11. Compounds of claim 1 wherein R is the diazobenezene radical and R¹ and R² are phenyl.

12. Compounds of claim 1 wherein R is halogen and R¹ and R² are phenyl.

13. Compounds of claim 1 wherein Z is Cl.

14. Compounds of claim 1 wherein Z is I₃.

15. Compounds of claim 1 wherein Z is BF₄.

16. Process for the preparation of compounds selected from the group consisting of compounds represented by the formulae (a)

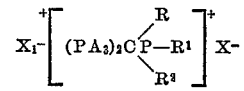

and (b)

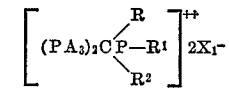

wherein each A is aryl, R¹ and R² are organic radicals containing from 1 to 20 carbon atoms in which any unsaturation is aromatic selected from the group consisting of hydrocarbyl, haloaryl and haloaralkyl, R is selected from the group consisting of hydrogen, alkyl of 1 to 12 carbon atoms, alkenyl of 2 to 12 carbon atoms, aralkyl of 7 to 12 carbon atoms, —N=NC₆H₅ and halogen, X₁ is halogen and X is a monovalent anion, which comprises reacting a mesomeric phosphonium salt of the formula

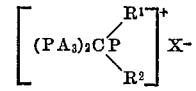

with a compound of the formula RX₁ wherein A, R, R¹, R², X and X₁ are as defined above.

17. The process of claim 16 wherein RX₁ is an alkyl halide of 1 to 12 carbon atoms.

18. The process of claim 17 wherein the alkyl halide is methyl halide.

19. The process of claim 16 wherein the PX₁ reactant is HCl.

References Cited

UNITED STATES PATENTS 3,330,868   7/1967   Grisley _____ 260—606.5
3,374,256   3/1968   Driscoll et al. ____ 260—606.5 X TOBIAS E. LEVOW, Primary Examiner.

W. F. W. BELLAMY, Assistant Examiner.

U.S. Cl. X.R.

252—8.1, 8.6; 260—999, 448.2, 448, 429, 446, 447, 439, 440, 429.7, 438.1, 429.9, 433, 435, 429.2, 607, 430, 429.5

PO-1050
(5/69)

UNITED STATES PATENT OFFICE
CERTIFICATE OF CORRECTION

Patent No. __3,426,074__     Dated __February 4, 1969__

Inventor(s) __Clifford N. Matthews et al__

It is certified that error appears in the above-identified patent and that said Letters Patent are hereby corrected as shown below:

Column 2, line 30 (second general equation), the line bonded to the C is "R-P-R$^2$" and should be -- R-P-R$^1$ --.

Column 7, line 68, "contained at" should be -- continued at --.

Column 9, line 35, the line bonded to the C is "CH$_3$PA$_3$" and should be -- CH$_3$PA$_2$ --.

Column 9, line 50 (Example 33), last column "C$_2$H$_5$OO" should be -- C$_2$H$_5$COO --.

Column 10, Claim 19, "PX$_1$" should be -- RX$_1$ --.

Signed and sealed this 31st day of August 1971.

(SEAL)
Attest:

EDWARD M. FLETCHER, JR.
Attesting Officer

ROBERT GOTTSCHALK
Acting Commissioner of Patents